US012567810B2

(12) United States Patent
Zuo et al.

(10) Patent No.:  US 12,567,810 B2
(45) Date of Patent:  Mar. 3, 2026

(54) CIRCUIT FOR CONTROLLING A SWITCHING MODE POWER SUPPLY AND THE METHOD THEREOF

(71) Applicant: Chengdu Monolithic Power Systems Co., Ltd., Chengdu (CN)

(72) Inventors: Qiaoan Zuo, Hangzhou (CN); Bin Xiao, Chengdu (CN); Hui Li, Hangzhou (CN); Guangzhuo Li, Hangzhou (CN)

(73) Assignee: Chengdu Monolithic Power Systems Co., Ltd., Chengdu (CN)

( * ) Notice: Subject to any disclaimer, the term of this patent is extended or adjusted under 35 U.S.C. 154(b) by 166 days.

(21) Appl. No.: 18/614,100

(22) Filed: Mar. 22, 2024

(65) Prior Publication Data

US 2024/0235401 A1     Jul. 11, 2024

Related U.S. Application Data

(63) Continuation-in-part of application No. 17/734,170, filed on May 2, 2022, now Pat. No. 11,996,778.

(30) Foreign Application Priority Data

May 13, 2021    (CN) .......................... 202110523789.9

(51) Int. Cl.
*H02M 3/335*       (2006.01)
*H02M 1/00*        (2006.01)

(52) U.S. Cl.
CPC ..... *H02M 3/33515* (2013.01); *H02M 1/0032* (2021.05); *H02M 1/0035* (2021.05); *H02M 3/33523* (2013.01)

(58) Field of Classification Search
CPC ........... H02M 3/33515; H02M 1/0035; H02M 1/0003; H02M 1/08; H02M 1/0032; Y02B 70/10
See application file for complete search history.

(56) References Cited

U.S. PATENT DOCUMENTS

| | | | |
|---|---|---|---|
| 6,366,070 B1 * | 4/2002 | Cooke ................. | H02M 3/1588 |
| | | | 323/284 |
| 7,679,341 B2 | 3/2010 | Chen | |
| 8,207,714 B2 | 6/2012 | Chen | |
| 8,238,123 B2 | 8/2012 | Zhang et al. | |
| 8,686,703 B2 | 4/2014 | Xi | |
| 9,093,909 B2 | 7/2015 | Wang et al. | |
| 9,190,913 B2 * | 11/2015 | Yamaguchi ............ | G03G 15/80 |

(Continued)

*Primary Examiner* — Yusef A Ahmed
(74) *Attorney, Agent, or Firm* — Perkins Coie LLP

(57)                ABSTRACT

A circuit for controlling a switching mode power supply having a power switch. The switching mode power supply includes a power switch. The control circuit includes a feedback pulse circuit, and a light load pulse circuit. When the load of the switching mode power supply is above a certain load level, the feedback pulse circuit provides a feedback pulse signal to control the power switch operating at a frequency which increases as a load of the switching mode power supply increases. When the load of the switching mode power supply is under the certain load level, the light load pulse circuit provides a light load pulse signal to control the power switch operating at different switching frequencies wherein the different switching frequencies includes at least two switching frequencies.

12 Claims, 8 Drawing Sheets

70

(56) References Cited

U.S. PATENT DOCUMENTS

| | | | | |
|---|---|---|---|---|
| 9,362,823 | B2 | 6/2016 | Li | |
| 9,379,616 | B2* | 6/2016 | Chung | H02M 1/08 |
| 9,641,085 | B2 | 5/2017 | Li | |
| 9,891,648 | B2 | 2/2018 | Li | |
| 10,164,514 | B2 | 12/2018 | Li | |
| 10,666,272 | B2* | 5/2020 | Li | H03L 7/093 |
| 10,952,299 | B1* | 3/2021 | Xiong | H02M 1/0058 |
| 11,855,537 | B2* | 12/2023 | Zhang | H02M 1/0032 |
| 2005/0078492 | A1* | 4/2005 | Takahashi | H02M 3/33523 363/21.15 |
| 2008/0043504 | A1* | 2/2008 | Ye | H02M 3/33507 363/97 |
| 2008/0130324 | A1* | 6/2008 | Choi | H02M 3/33507 363/21.03 |
| 2008/0180078 | A1* | 7/2008 | Hiasa | H02M 3/33507 323/282 |
| 2009/0091304 | A1* | 4/2009 | Yang | H02M 3/1584 323/242 |
| 2010/0061129 | A1* | 3/2010 | Fujii | H02M 3/33523 363/127 |
| 2010/0208500 | A1* | 8/2010 | Yan | H02M 3/33523 363/21.12 |
| 2011/0007526 | A1* | 1/2011 | Zhang | H02M 3/1563 363/21.02 |
| 2011/0084677 | A1* | 4/2011 | Shi | H02M 3/33507 323/284 |
| 2011/0175584 | A1* | 7/2011 | Huber | H02M 3/158 323/282 |
| 2011/0175587 | A1* | 7/2011 | Hosotani | H02M 3/3376 323/283 |
| 2011/0228570 | A1 | 9/2011 | Li et al. | |
| 2011/0255310 | A1* | 10/2011 | Djenguerian | H02M 3/33523 363/21.12 |
| 2012/0176820 | A1* | 7/2012 | Li | H02M 3/33507 363/21.12 |
| 2013/0027985 | A1* | 1/2013 | Wang | H02M 3/33507 363/21.01 |
| 2013/0033902 | A1* | 2/2013 | Zhang | H02M 3/33523 363/15 |
| 2013/0301311 | A1* | 11/2013 | Wang | H02M 3/33515 363/21.13 |
| 2014/0016373 | A1* | 1/2014 | Zhang | H02M 3/33507 363/21.15 |
| 2014/0035654 | A1* | 2/2014 | Jiang | H03K 17/16 327/365 |
| 2014/0043002 | A1* | 2/2014 | Chung | H02M 1/08 323/283 |
| 2014/0049235 | A1* | 2/2014 | Li | H02M 3/156 323/271 |
| 2014/0078790 | A1* | 3/2014 | Lin | H02M 3/33507 363/21.16 |
| 2014/0084885 | A1* | 3/2014 | Ouyang | H02M 3/158 323/271 |
| 2014/0160601 | A1* | 6/2014 | Ouyang | H02M 3/1588 361/18 |
| 2014/0177290 | A1* | 6/2014 | Zhang | H02M 3/33507 363/21.13 |
| 2015/0244276 | A1* | 8/2015 | Li | H03K 21/08 363/21.17 |
| 2016/0322908 | A1* | 11/2016 | Chen | H02M 3/33523 |
| 2017/0085185 | A1* | 3/2017 | Wang | H02M 1/08 |
| 2017/0366090 | A1* | 12/2017 | Sugawara | H02M 3/156 |
| 2018/0062527 | A1* | 3/2018 | Lu | H02M 3/18 |
| 2018/0131379 | A1* | 5/2018 | Li | H03K 5/24 |
| 2018/0269783 | A1* | 9/2018 | Yin | H02M 1/0043 |
| 2018/0351464 | A1* | 12/2018 | Finkel | H02M 3/33507 |
| 2019/0190391 | A1* | 6/2019 | Takahashi | H02M 3/33507 |
| 2020/0195154 | A1* | 6/2020 | Mayell | H02M 1/083 |
| 2022/0045607 | A1* | 2/2022 | Li | H02M 1/0032 |
| 2022/0190722 | A1* | 6/2022 | Zhang | H02M 1/0032 |
| 2022/0368236 | A1 | 11/2022 | Li et al. | |
| 2024/0014741 | A1* | 1/2024 | Imade | H02M 1/344 |

* cited by examiner

60

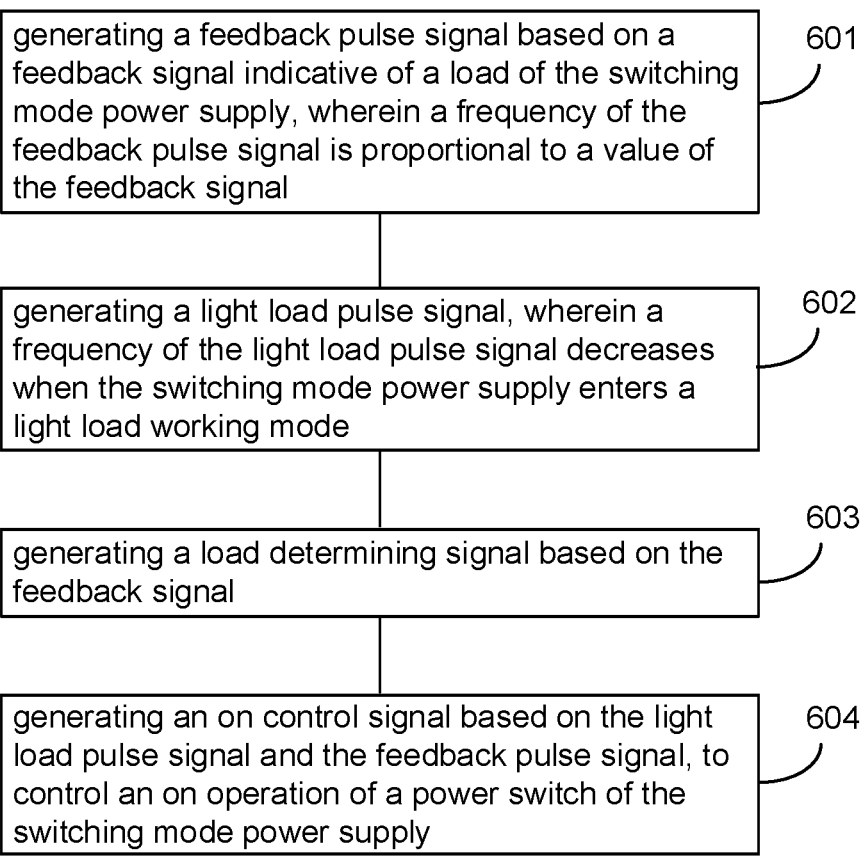

| | |
|---|---|
| generating a feedback pulse signal based on a feedback signal indicative of a load of the switching mode power supply, wherein a frequency of the feedback pulse signal is proportional to a value of the feedback signal | 601 |
| generating a light load pulse signal, wherein a frequency of the light load pulse signal decreases when the switching mode power supply enters a light load working mode | 602 |
| generating a load determining signal based on the feedback signal | 603 |
| generating an on control signal based on the light load pulse signal and the feedback pulse signal, to control an on operation of a power switch of the switching mode power supply | 604 |

FIG. 6

CIRCUIT FOR CONTROLLING A SWITCHING MODE POWER SUPPLY AND THE METHOD THEREOF

CROSS-REFERENCE TO RELATED APPLICATIONS

This application is a continuation-in-part of U.S. patent application Ser. No. 17/734,170, filed on May 2, 2022, which claims priority to Chinese Patent Application No. 202110523789.9, filed on May 13, 2021, which are both incorporated herein by reference.

FIELD

The present invention relates generally to electronic circuits, and more particularly but not exclusively to a control circuit for an isolated switching mode power supply and the method thereof.

BACKGROUND

FIG. 1 schematically shows a typical isolated switching mode power supply, i.e., a flyback converter 10. As shown in FIG. 1, the flyback converter 10 comprises a transformer T1, a primary side circuit comprising a power switch PM1 and a primary control circuit 101, and a secondary side circuit comprising a diode D1 and an output capacitor Co, wherein the primary side circuit and the secondary side circuit are isolated by the transformer T1. The transformer T1 comprises a primary winding Lp receiving an input voltage Vi, and a second winding Ls providing an output voltage Vo to a load. The primary control circuit 101 controls the power switch PM1 to transfer energy from the primary side circuit to the secondary side circuit to power the load, based on a feedback voltage Vfb indicating output information of the flyback converter 10.

Isolators like optocoupler for feeding back the feedback voltage Vfb from the secondary side to the primary side is removed in the primary controlled flyback converter 10 in FIG. 1 for saving cost, and then the feedback voltage Vfb is obtained indirectly, which brings in imprecision. In this case, the flyback converter 10 may not be able to enter a light load working mode timely, resulting in low efficiency during light load working mode.

In addition, to achieve low power dissipation during light load working mode or no load mode, the prior art flyback converter usually decreases a switching frequency of the power switch PM1 to a very low level. However, low switching frequency makes the loop compensation for the whole circuit system difficult, and also may introduce unwanted audible noise.

SUMMARY

It is an object of the present invention to provide a circuit for controlling a switching mode power supply smoothly switch between a normal working mode and a light load working mode, and meanwhile to avoid audible noise and simplify the loop compensation design of the switching mode power supply by controlling the switching frequency under light load working mode.

In accomplishing the above and other objects, there has been provided, in accordance with an embodiment of the present invention, a control circuit of a switching mode power supply. The switching mode power supply includes a power switch. The control circuit includes a feedback pulse circuit, and a light load pulse circuit. When the load of the switching mode power supply is above a certain load level, the feedback pulse circuit provides a feedback pulse signal to control the power switch operating at a frequency which increases as a load of the switching mode power supply increases. When the load of the switching mode power supply is under the certain load level, the light load pulse circuit provides a light load pulse signal to control the power switch operating at different switching frequencies wherein the different switching frequencies includes at least two switching frequencies.

In accomplishing the above and other objects, there has been provided, in accordance with an embodiment of the present invention, a switching mode power supply including a power switch and a control circuit. The control circuit provides an on control signal for turning on the power switch. The control circuit includes a feedback pulse circuit and a light load pulse circuit. When the load of the switching mode power supply is above a certain load level, the feedback pulse circuit provides a feedback pulse signal to control the power switch operating at a frequency which increases as a load of the switching mode power supply increases. When the load of the switching mode power supply is under the certain load level, the light load pulse circuit provides a light load pulse signal to control the power switch operating at different switching frequencies, wherein the different switching frequencies includes at least two switching frequencies.

In accomplishing the above and other objects, there has been provided, in accordance with an embodiment of the present invention, a control method for controlling a switching mode power supply. The control method includes: controlling the power switching operating at a frequency which increases as a load of the switching mode power supply increases when the load of the switching mode power supply is above a certain load level; and controlling the power switch operating at different switching frequencies when the load of the switching mode power supply is under the certain load level, wherein the different switching frequencies includes at least two switching frequencies.

BRIEF DESCRIPTION OF THE DRAWINGS

FIG. 6 shows a flow chart of a control method 60 for controlling a switching mode power supply in accordance with an embodiment of the present invention.

The use of the same reference label in different drawings indicates the same or like components.

DETAILED DESCRIPTION

In the present invention, numerous specific details are provided, such as examples of circuits, components, and methods, to provide a thorough understanding of embodiments of the invention. Persons of ordinary skill in the art would recognize, however, that the invention can be practiced without one or more of the specific details. In other instances, well-known details are not shown or described to avoid obscuring aspects of the invention.

Figure 1:
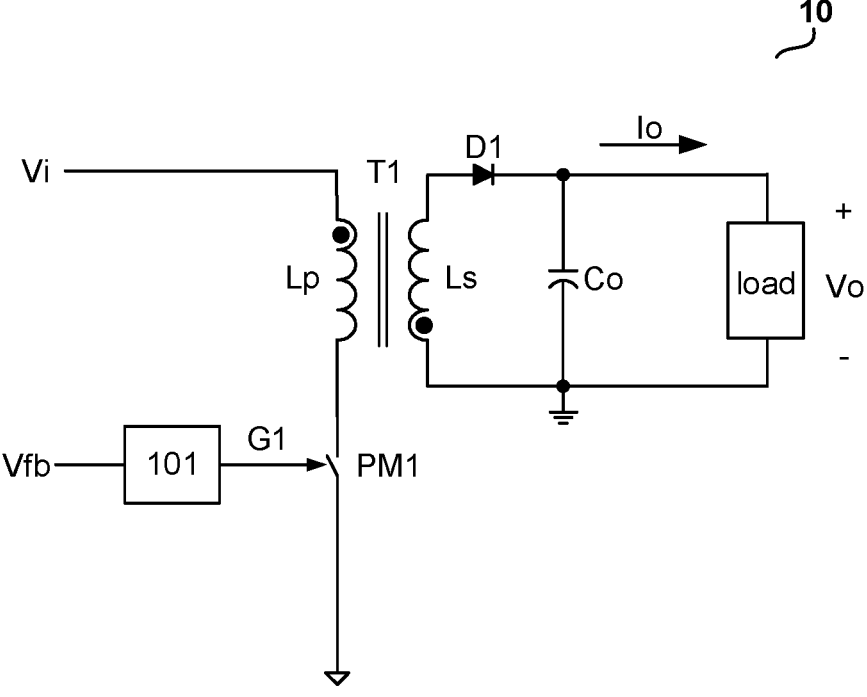
FIG. 1 schematically shows a prior art isolated switching mode power supply 10.
Figure 2:
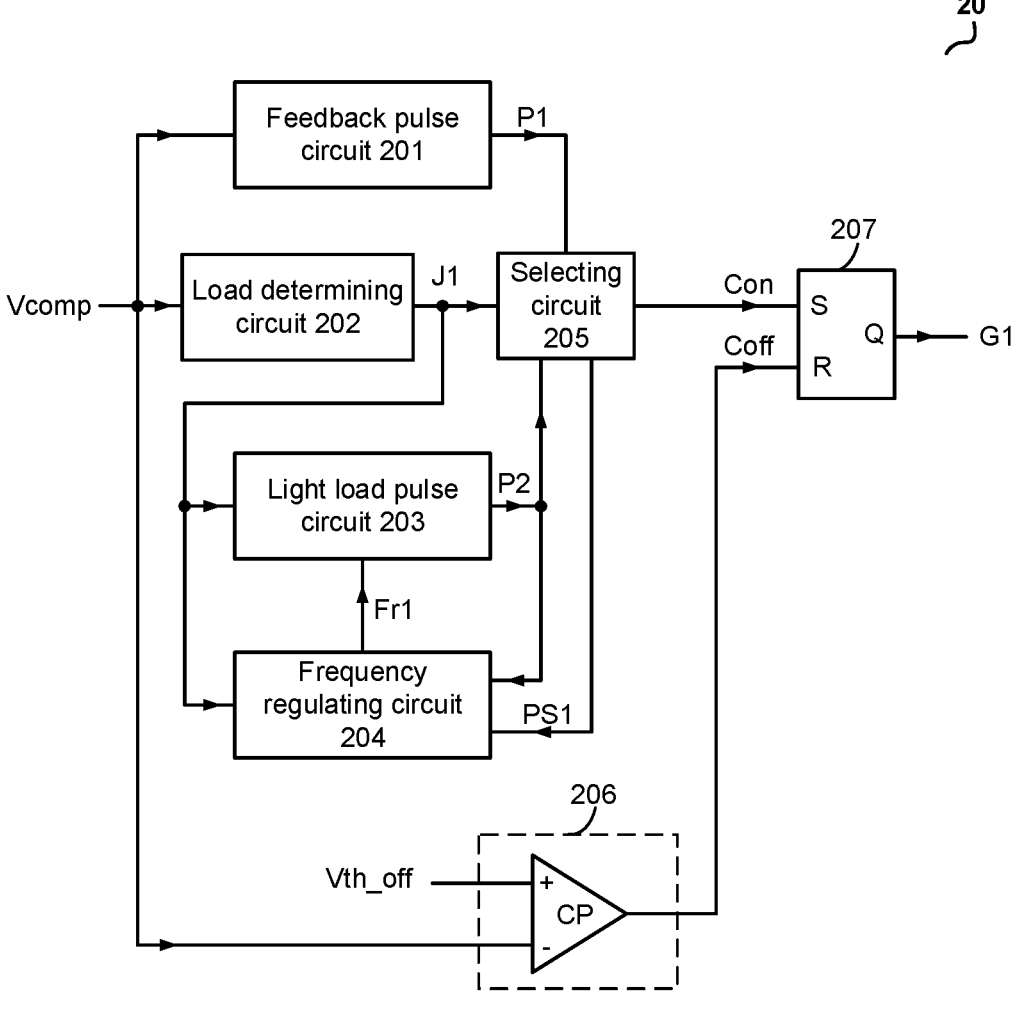
FIG. 2 schematically shows a control circuit 20 of a switching mode power supply in accordance with an embodiment of the present invention.

FIG. 2 schematically shows a control circuit 20 of a switching mode power supply in accordance with an embodiment of the present invention. The control circuit 20 may be used with the flyback converter 10 in FIG. 1, and also could be used with switching mode power supplies having other topologies, like buck converter, boost converter, buck-boost converter, etc. As shown in FIG. 2, the control circuit 20 comprises a feedback pulse circuit 201, a load determining circuit 202, a light load pulse circuit 203, a frequency regulating circuit 204 and a selecting circuit 205. The feedback pulse circuit 201 is configured to receive a feedback signal Vcomp, and to provide a feedback pulse signal P1 based on the feedback signal Vcomp. The load determining circuit 202 is configured to receive the feedback signal Vcomp, and to provide a load determining signal J1 based on the feedback signal Vcomp. The light load pulse circuit 203 is configured to receive the load determining signal J1 and a frequency regulating signal Fr1, and to provide a light load pulse signal P2 based on the load determining signal J1 and the frequency regulating signal Fr1. The frequency regulating circuit 204 is configured to receive the load determining signal J1, the light load pulse signal P2 and a normal load pulse signal PS1, wherein based on the load determining signal J1, the light load pulse signal P2 and the normal load pulse signal PS1, the frequency regulating circuit 204 provides the frequency regulating signal Fr1. The selecting circuit 205 is configured to receive the load determining signal J1, the feedback pulse signal P1 and the light load pulse signal P2, wherein based on the load determining signal J1, the feedback pulse signal P1 and the light load pulse signal P2, the selecting circuit 205 provides an on control signal Con and the normal load pulse signal PS1. In the embodiment of FIG. 2, the control circuit 20 further comprises an off control circuit 206 and a driving logic circuit 207. The off control circuit 206 is configured to receive the feedback signal Vcomp and an off threshold signal Vth_off, and based Gon the feedback signal Vcomp and the off threshold signal Vth_off, the off control circuit 206 provides an off control signal Coff. The driving logic circuit 207, configured to receive the on control signal Con and the off control signal Coff, and based on the on control signal Con and the off control signal Coff, the driving logic circuit 207 provides a power control signal G1, for controlling the power switch PM1 shown in FIG. 1.

In the embodiments of the present invention, when the load is light, the switching mode power supply, like the flyback converter 10 in FIG. 1, works under light load working mode, otherwise, the switching mode power supply works under normal working mode. The feedback signal Vcomp indicates the load condition. In one embodiment, the feedback signal Vcomp is an amplified error between the output voltage Vo and a reference voltage, or an amplified error between partial of the output voltage Vo and the reference voltage. In one embodiment, the feedback signal Vcomp increases as the load increases, and decreases as the load decreases. In some embodiments, the feedback signal Vcomp may be inversely proportional to the load.

In one embodiment, the feedback pulse circuit 201 is a voltage-frequency converting circuit. The feedback pulse circuit 201 provides the feedback pulse signal P1 having a frequency proportional to a voltage of the feedback signal Vcomp. In one embodiment, the larger the voltage of the feedback signal Vcomp, the higher the frequency of the feedback pulse signal P1.

In the control circuit 20, the load determining circuit 202 provides the load determining signal J1 based on the voltage of the feedback signal Vcomp to indicate the load condition. The selecting circuit 205 receives the load determining signal J1. When the load determining signal J1 indicates that the load is normal, the feedback pulse signal P1 is selected to be the on control signal Con, otherwise, the light load pulse signal P2 is selected to be the on control signal Con.

In the present invention, the normal load condition and the light load condition are determined according to the application. Persons of ordinary skill in the art could set a load threshold, and then define the normal load condition when the load is larger than the load threshold, and define the light load condition when the load is smaller than the load threshold. Meanwhile, the normal working mode corresponds to a working state of the switching mode power supply under normal load condition, and the light load working mode corresponds to a working state of the switching mode power supply under light load condition.

The light load pulse signal P2 provided by the light load pulse circuit 203 has a preset frequency. In some embodiments, the frequency of the light load pulse signal P2 is controlled to be lower than the lower limit of the audible noise range, i.e., 20 Hz. Under light load working mode, the frequency regulating signal Fr1 regulates the frequency of the light load pulse signal P2, to make the frequency of the light load pulse signal P2 decrease or increase from the preset value to an optimum value under the current load condition.

When the load determining signal J1 indicates the normal load condition, the feedback pulse signal P1 is provided to be the normal load pulse signal PS1, and is then selected to be the on control signal Con. Under light load working mode, the light load pulse signal P2 is selected to be the on control signal. Under a critical load condition between the normal load condition and the light load condition, the switching mode power supply may enter and exit the light load working mode frequently, and accordingly, the light load pulse signal P2 changes frequently, since every time the switching mode power supply enters the light load working mode, the frequency of the light load pulse signal P2 either decreases or increases from the preset value. To prevent the frequent change of the frequency of the light load pulse signal P2, the normal load pulse signal PS1 is adopted by the frequency regulating circuit 204 to keep the frequency regulating signal Fr1 unchanged, so as to fix the frequency of the light load pulse signal P2. In some embodiments, the load determining signal J1, instead of the normal load pulse signal PS1, is adopted to control the frequency regulating circuit 204.

In the embodiment of FIG. 2, the off control circuit 206 comprises a comparator. The comparator receives the off threshold signal Vth_off and the feedback signal Vcomp, and provides the off control signal Coff to control the off operation of the power switch PM1 based on a comparison result of the off threshold signal Vth_off and the feedback signal Vcomp. It should be understood that the feedback signal Vcomp could be replaced by other signals associated with the load, e.g., a load current indicating signal, an inductor current signal of the switching mode power supply. Furthermore, in some embodiments, instead of turning off the power switch when the feedback signal Vcomp is lower than the off threshold signal Vth_off, other control methods, like the constant-on-time control, which means the power switch is turned off after being on for a preset time, may be adopted to turn off the power switch PM1.

In one embodiment, the driving logic circuit 207 comprises a RS flip-flop. The RS flip-flop comprises a set terminal "S" (the first input terminal), a reset terminal "R" (the second input terminal) and an output terminal, wherein the set terminal "S" receives the on control signal Con, the reset terminal "R" receives the off control signal Coff, and wherein based on the on control signal Con and the off control signal Coff, the RS flip-flop provides the power control signal G1 at the output terminal. In one embodiment, when the RS flip-flop is set by pulses of the on control signal Con, the power control signal G1 becomes logic high to turn on the power switch PM1. When the RS flip-flop is reset by pulses of the off control signal Coff, the power control signal G1 becomes logic low to turn off the power switch PM1. It should be understood that the logic states (pulse control or level control) of the signals, and the corresponding relationship to the operations of the power switch PM1, are decided by applications, and are not limited by the embodiments of the present invention.

Figure 3:
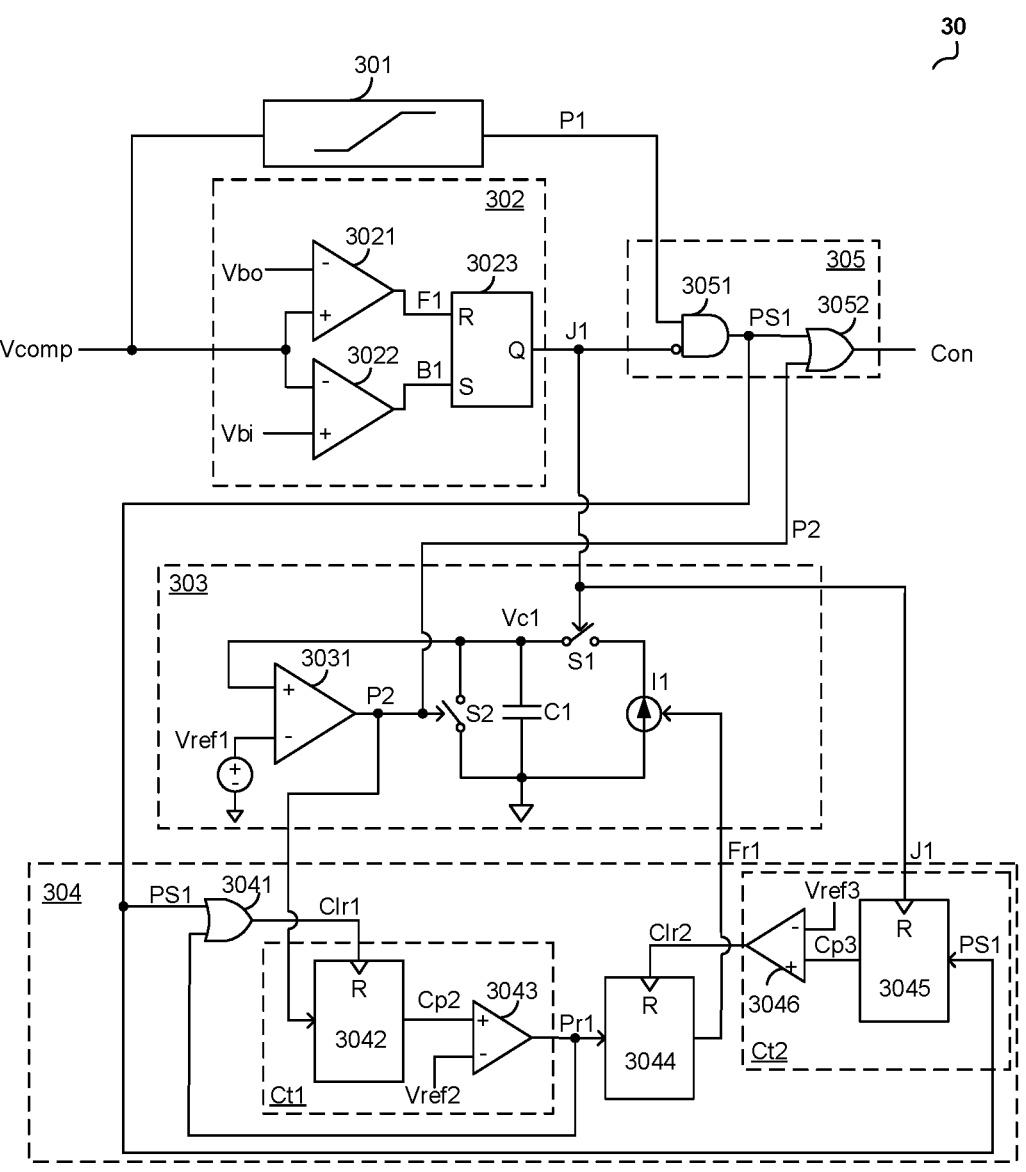
FIG. 3 schematically shows a control circuit 30 of a switching mode power supply in accordance with an embodiment of the present invention.

FIG. 3 schematically shows a control circuit 30 of a switching mode power supply in accordance with an embodiment of the present invention. The control circuit 30 may be used with the flyback converter 10 in FIG. 1, and also could be used with switching mode power supplies having other topologies, like buck converter, boost converter, buck-boost converter, etc. As shown in FIG. 3, the control circuit 30 comprises a feedback pulse circuit 301, a load determining circuit 302, a light load pulse circuit 303, a frequency regulating circuit 304 and a selecting circuit 305. The feedback pulse circuit 301 is configured to receive the feedback signal Vcomp, and to provide the feedback pulse signal P1 based on the feedback signal Vcomp. The load determining circuit 302 is configured to receive the feedback signal Vcomp, and to provide the load determining signal J1 based on the feedback signal Vcomp. The light load pulse circuit 303 is configured to receive the load determining signal J1 and the frequency regulating signal Fr1, and to provide the light load pulse signal P2 based on the load determining signal J1 and the frequency regulating signal Fr1. The frequency regulating circuit 304 is configured to receive the load determining signal J1, the light load pulse signal P2 and the normal load pulse signal PS1, wherein based on the load determining signal J1, the light load pulse signal P2 and the normal load pulse signal PS1, the frequency regulating circuit 304 provides the frequency regulating signal Fr1. The selecting circuit 305 is configured to receive the load determining signal J1, the feedback pulse signal P1 and the light load pulse signal P2, wherein based on the load determining signal J1, the feedback pulse signal P1 and the light load pulse signal P2, the selecting circuit 305 provides the on control signal Con and the normal load pulse signal PS1.

As shown in FIG. 3, the load determining circuit 302 comprises an exit-light-load-mode comparator 3021, an enter-light-load-mode comparator 3022 and a RS flip-flop

3023. The exit-light-load-mode comparator 3021 has a first input terminal configured to receive an exit-light-load-mode threshold Vbo, a second input terminal configured to receive the feedback signal Vcomp, and an output terminal configured to provide an exit-light-load-mode setting signal F1 based on a comparison result of the exit-light-load-mode threshold Vbo and the feedback signal Vcomp. The enter-light-load-mode comparator 3022 has a first input terminal configured to receive the feedback signal Vcomp, a second input terminal configured to receive an enter-light-load-mode threshold Vbi, and an output terminal configured to provide an enter-light-load-mode setting signal B1 based on a comparison result of the enter-light-load-mode threshold Vbi and the feedback signal Vcomp. In one embodiment, the enter-light-load-mode threshold Vbi is lower than the exit-light-load-mode threshold Vbo. The RS flip-flop 3023 has a set terminal "S" (the first input terminal) configured to receive the enter-light-load-mode setting signal B1, a reset terminal "R" (the second input terminal) configured to receive the exit-light-load-mode setting signal F1, and an output terminal "Q" configured to provide the load determining signal J1.

As shown in FIG. 3, the light load pulse circuit 303 comprises a light load pulse comparator 3031, a charging control switch S1, a discharging control switch S2, a capacitor C1 and a current source I1. The light load pulse comparator 3031 has a first input terminal configured to receive a capacitor voltage Vc1 across the capacitor C1, a second input terminal configured to receive a light load pulse reference Vref1, and an output terminal configured to provide the light load pulse signal P2 based on a comparison result of the capacitor voltage Vc1 and the light load pulse reference Vref1. The current source I1 charges the capacitor C1 to build up the capacitor voltage Vc1. The charging control switch S1 is controlled by the load determining signal J1. When the load determining signal J1 indicates a light load condition, the charging control switch S1 is turned on, and then the current source I1 charges the capacitor C1. The discharging control switch S2 is controlled by the light load pulse signal P2. The discharging control switch S2 is turned on by the pulses of the light load pulse signal P2, and then the capacitor C1 is discharged. A charging current of the current source I1 is controlled by the frequency regulating signal Fr1. In one embodiment, the charging current of the current source I1 decreases as the frequency regulating signal Fr1 increases. In other embodiments, the charging current of the current source I1 may increase as the frequency regulating signal Fr1 increases according to the applications.

As shown in FIG. 3, the frequency regulating circuit 304 comprises a logic gate circuit 3041, a first counting control circuit Ct1, a counting circuit 3044 and a second counting control circuit Ct2. In the embodiment of FIG. 3, the logic gate circuit 3041 comprises an OR gate, configured to receive the normal load pulse signal PS1 and a light load pulse regulating signal Pr1, and to provide a first reset signal Clr1 based on an logic OR operation to the normal load pulse signal PS1 and the light load pulse regulating signal Pr1. The first counting control circuit Ct1 receives the first reset signal Clr1 and the light load pulse signal P2, and provides the light load pulse regulating signal Pr1 based on the first reset signal Clr1 and the light load pulse signal P2. The second counting control circuit Ct2 receives the load determining signal J1 and the normal load pulse signal PS1, and provides a second reset signal Clr2 based on the load determining signal J1 and the normal load pulse signal PS1. The counting circuit 3044 has a reset terminal "R" configured to receive the second reset signal Clr2, an input terminal configured to receive the light load pulse regulating signal Pr1, and an output terminal configured to provide the frequency regulating signal Fr1.

In one embodiment, the first counting control circuit Ct1 comprises a counting circuit 3042 and a comparator 3043. The counting circuit 3042 receives the light load pulse signal P2, and provides a light load pulse counting signal Cp2. The comparator 3043 receives the light load pulse counting signal Cp2 and a light load pulse reference Vref2, and provides the light load pulse regulating signal Pr1 based on a comparison result of the light load pulse counting signal Cp2 and the light load pulse reference Vref2. In one embodiment, the comparator 3043 could be a digital comparator. In some embodiments, the comparator 3043 could also be an analog comparator, and then the light load pulse counting signal Cp2 may be converted to an analog signal before provided to the comparator 3043. When the light load pulse counting signal Cp2 reaches the light load pulse reference Vref2, the light load pulse regulating signal Pr1 flips to logic high, and the counting circuit 3044 counts once. The light load pulse regulating signal Pr1 is also provided to reset the counting circuit 3042 through the logic gate circuit 3041. The counting circuit 3044 provides the frequency regulating signal Fr1 based on the light load pulse regulating signal Pr1. In one embodiment, the frequency regulating signal Fr1 decreases once the light load pulse regulating signal Pr1 flips to logic high. That means, when the pulses of the light load pulse signal P2 reaches a number decided by the light load pulse reference Vref2, e.g., 4, the light load pulse regulating signal Pr1 flips to logic high, which causes the frequency regulating signal Fr1 to decrease. Accordingly, the charging current provided by the current source I1 decreases, slowing down the increasing speed of the capacitor voltage Vc1, thereby decreasing the pulse frequency of the light load pulse signal P2. The counting circuit 3042 could also be reset by pulses of the normal load pulse signal PS1. Once the counting circuit 3042 is reset, the light load pulse regulating signal Pr1 and the frequency regulating signal Fr1 remain unchanged, and so is the frequency of the light load pulse signal P2.

In one embodiment, the second counting control circuit Ct2 comprises a counting circuit 3045 and a comparator 3046. The counting circuit 3045 receives the normal load pulse signal PS1, and provides a pulse counting signal Cp3 based on the pulses of the normal load pulse signal PS1. The comparator 3046 receives the pulse counting signal Cp3 and a normal load pulse reference Vref3, and provides the second reset signal Clr2 based on a comparison result of the pulse counting signal Cp3 and the normal load pulse reference Vref3. In one embodiment, the comparator 3046 could be a digital comparator. In some embodiments, the comparator 3046 could also be an analog comparator, and then the light load pulse counting signal Cp3 may be converted to an analog signal before provided to the comparator 3046. In one embodiment, when the pulses of the normal load pulse signal PS1 reaches a number decided by the normal load pulse reference Vref3, e.g., 4, the comparator 3046 flips to output a logic high second reset signal Clr2 to reset the counting circuit 3044.

The counting circuit 3044 provides the frequency regulating signal Fr1 based on the light load pulse regulating signal Pr1, and could be reset by the second reset signal Clr2. When the light load pulse regulating signal Pr1 flips to logic high, the frequency regulating signal Fr1 decreases. When the pulse counting signal Cp3 reaches the normal load pulse reference Vref3, indicating that the switching mode power supply need to exit the light load working mode, the second reset signal Clr2 resets the counting circuit 3044. Then the frequency regulating signal Fr1 returns back to an initial value, and decreases from the initial value next time the switching mode power supply enters the light load working mode.

In the embodiment of FIG. 3, the selecting circuit 305 comprises an AND gate 3051 and an OR gate 3052. The AND gate 3051 receives the feedback pulse signal P1 and the load determining signal J1, and provides the normal load pulse signal PS1. The OR gate 3052 receives the normal load pulse signal PS1 and the light load pulse signal P2, and provides the on control signal Con. In the embodiment of FIG. 3, the load determining signal J1 is inverted before provided to the AND gate 3051. When the load determining signal J1 is logic low, the switching mode power supply needs to exit the light load working mode. Then the inverted load determining signal J1 is logic high, and the feedback pulse signal P1 passes the AND gate 3051 to be the normal load pulse signal PS1. When the load determining signal J1 is logic high, the switching mode power supply needs to enter the light load working mode. Then the inverted load determining signal J1 is logic low, and the feedback pulse signal P1 is blocked by the AND gate 3051. As a result, the normal load pulse signal PS1 keeps logic low. The OR gate 3052 provides the light load pulse signal P2 to be the on control signal Con to control the on operation of the power switch PM1. It should be understood that the signals and the circuits in the embodiment of FIG. 3 are only for illustration. The forms of the signals of the selecting circuit 305 may be changed in some embodiments, and thus the selecting circuit 305 is changed accordingly. For example, when the logic low state of the load determining signal J1 indicates the light load condition, the load determining signal J1 could be provided to the AND gate 3051 directly without inversion.

Figure 4:
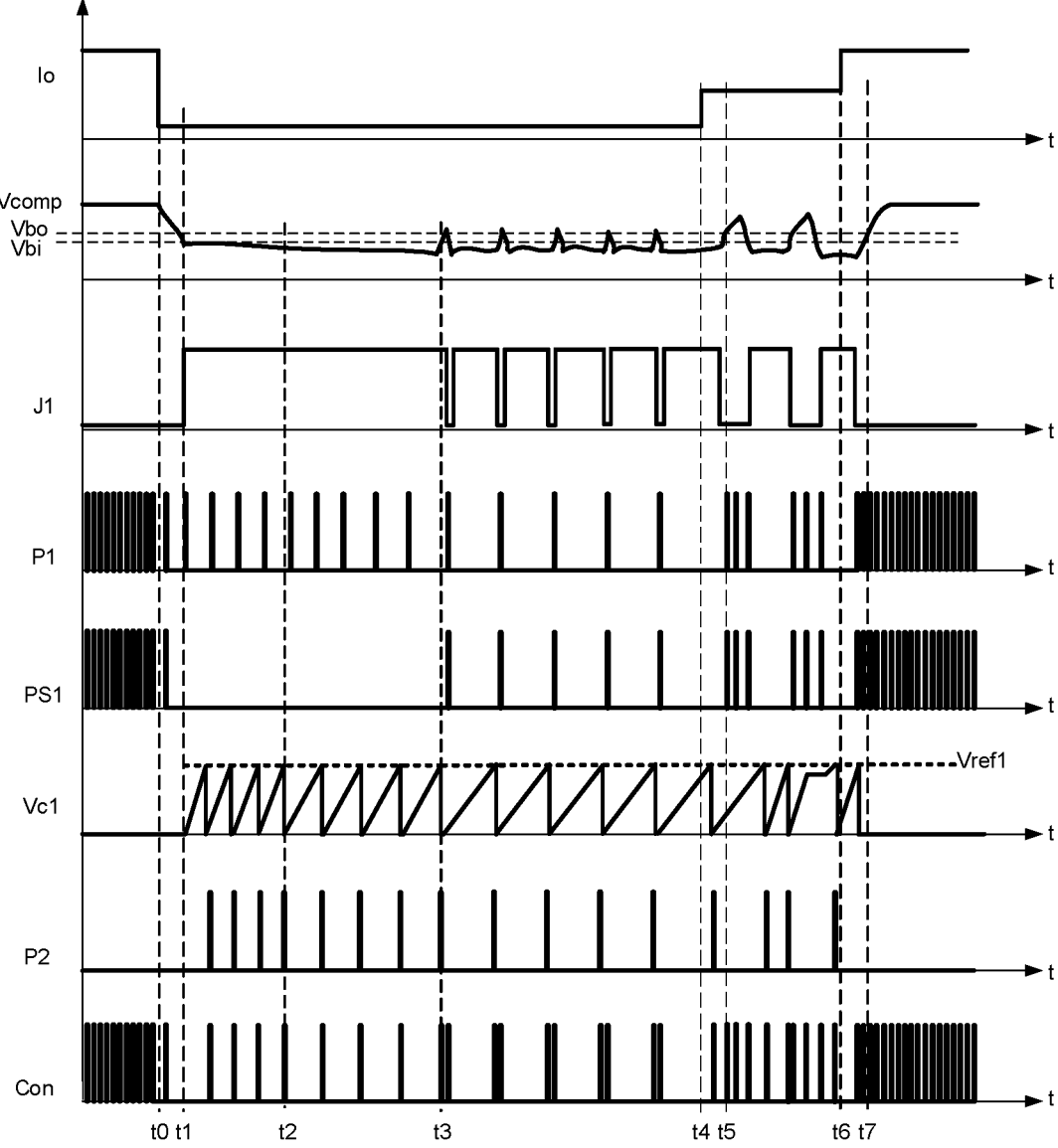
FIG. 4 schematically shows signal waveforms of the control circuit 30 in accordance with an embodiment of the present invention.

FIG. 4 schematically shows signal waveforms of the control circuit 30 in accordance with an embodiment of the present invention, wherein Io represents the output current of the switching mode power supply, i.e., the load current.

The operation of the control circuit 30 in FIG. 3 is illustrated with references to FIGS. 3 and 4. As shown in FIG. 4, at time t0, the output current Io drops, followed by the decreasing of the feedback signal Vcomp. At time t1, the feedback signal Vcomp reaches the enter-light-load mode threshold Vbi, and the load determining signal J1 turns to logic high. Then the switching mode power supply enters the light load working mode. Under the light load working mode, the feedback pulse signal P1 is blocked by the AND gate 3051, thus the normal load pulse signal PS1 keeps logic low, and the light load pulse signal P2 is provided as the on control signal Con. At time t2, the number of the pulses of the light load pulse signal P2 reaches 4, i.e., the light load pulse counting signal Cp2 reaches the light load pulse reference Vref2. Then the light load pulse regulating signal Pr1 flips to logic high, and the frequency regulating signal Fr1 increases followed by the decreasing of the charging current I1. As a result, the increasing rate of the capacitor voltage Vc1 slows down, and the frequency of the light load pulse signal P2 during time t2-t3 decreases. Meanwhile, the light load pulse regulating signal Pr1 resets the counting circuit 3042 via the OR gate 3041, and then the light load pulse counting signal Cp2 turns logic low. As a result, the light load pulse regulating signal Pr1 is logic low. At time t3, the number of the pulses of the light load pulse signal P2 reaches 4, i.e., the light load pulse counting signal Cp2 reaches the light load pulse reference Vref2 again. Then, the light load pulse regulating signal Pr1 flips to logic high, makes the frequency regulating signal Fr1 increase and the charging current of the current source I1 decrease. As a result, the frequency of the pulses of the light load pulse signal P2 further decreases. At time t3, the power provided by the switching mode power supply under light load working mode is not enough for the load, the feedback signal Vcomp increases. When the feedback signal Vcomp reaches the exit-light-load-mode threshold Vbo, the load determining signal J1 flips to logic low. Then the feedback pulse signal P1 passes the AND gate 3051 to be the normal load pulse signal PS1. The normal load pulse signal PS1 is superimposed upon the light load pulse signal P2 to generate the on control signal Con, which makes the switching mode power supply exit the light load working mode quickly. At time t4, the feedback signal Vcomp increases for the load and the output current lo increases. Then the frequency of the pulses of the feedback pulse signal P1 increases too. At time t5, the feedback signal Vcomp reaches the exit-light-load-mode threshold Vbo and the load determining signal J1 flips to logic low. Then during time t5-t6, the feedback pulse signal P1, i.e., the normal load pulse signal PS1, is superimposed upon the light load pulse signal P2 to generate the on control signal Con. At time t6, the output current lo increases again. At time t7, the feedback signal Vcomp increases to the exit-light-load-mode threshold Vbo again, and keeps larger than the exit-light-load-mode threshold Vbo hereafter, which means the switching mode power supply works under normal working mode. During this time, the frequency of the pulses of the normal load pulse signal PS1 increases, i.e., the pulse counting signal Cp3 increases to the normal load pulse reference Vref3, and then the comparator 3046 flips to provide the second reset signal Clr2 to reset the counting circuit 3044. As a result, the frequency regulating signal Fr1 is reset to the initial value before entering the light load working mode the next time. Meanwhile, the load determining J1 turns off the charging switch S1, and the current source I1 stops charging the capacitor C1. Then the light load pulse signal P2 stops pulsing, and the on control signal Con equals to the feedback pulse signal P1.

Figure 5:
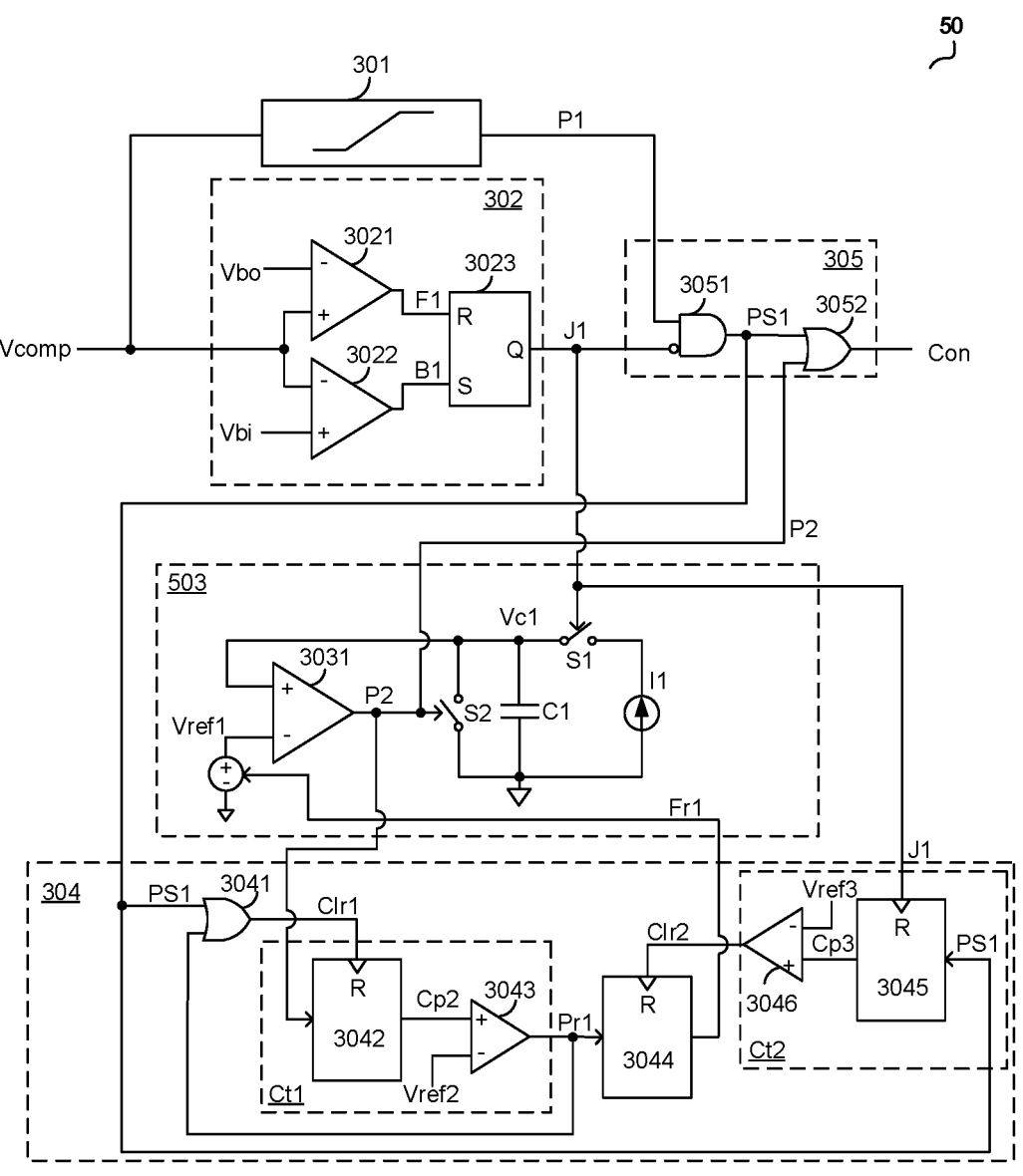
FIG. 5 schematically shows a control circuit 50 of a switching mode power supply in accordance with an embodiment of the present invention.

FIG. 5 schematically shows a control circuit 50 of a switching mode power supply in accordance with an embodiment of the present invention. The control circuit 50 is similar with the control circuit 30 in FIG. 3, the main difference is that, in control circuit 30, the frequency regulating signal Fr1 is adopted to regulate the charging current provided by the current source I1, thereby to regulate the frequency of the light load pulse signal P2, whereas in FIG. 5, the frequency regulating signal Fr1 is adopted to regulate the value of the light load pulse reference Vref1. In one embodiment, the light load pulse reference Vref1 increases as the frequency regulating signal Fr1 increases, which prolongs the time needed for the capacitor voltage Vc1 to reach the light load pulse reference Vref1, thereby to decrease the frequency of the light load pulse signal P2.

FIG. 6 shows a flow chart of a method 60 for controlling a switching mode power supply in accordance with an embodiment of the present invention. The switching mode power supply could be the flyback converter 10 in FIG. 1 and comprises a power switch configured to control the power conversion. It should be understood that the switching mode power supply in the present invention is not limited to the flyback converter, but comprises other topologies, e.g., buck, boost, buck-boost. The control method 60 is adopted to control the power switch of the switching mode power supply. As shown in FIG. 6, the control method 60 comprises steps 601~604 which are carried out without specific orders. Step 601, generating a feedback pulse signal based on a feedback signal representing a load condition of the switching mode power supply, wherein a frequency of the feedback pulse signal is proportional to a value of the feedback signal. Step 602, generating a light load pulse signal, wherein from when the switching mode power supply enters the light load working mode, the frequency of the light load pulse signal decreases. Step 603, generating a load determining signal based on the feedback signal, wherein when the feedback signal is lower than the enter-light-load mode threshold, the load determining signal indicates that the switching mode power supply works under light load working mode, and when the feedback signal is larger than the exit-light-load mode threshold, the load determining signal indicates that the switching mode power supply works under normal working mode. Step 604, generating an on control signal based on the light load pulse signal and the feedback pulse signal, to control the on operation of the power switch.

In one embodiment, the control method 60 further comprises step 605, generating an off control signal based on the feedback signal and an off threshold signal, to control the off operation of the power switch.

In one embodiment, the enter-light-load mode threshold is lower than the exit-light-load mode threshold.

In one embodiment, the frequency of the light load pulse signal is lower than the lower limit of the audible noise, i.e., 20 Hz.

In one embodiment, the frequency of the feedback pulse signal is higher than the upper limit of the audible noise, i.e., 20 KHz.

In one embodiment, the step 602 comprises: charging a capacitor by a current source to provide a capacitor voltage; generating a light load pulse signal based on a comparison result of the capacitor voltage and a light load pulse reference; discharging the capacitor in response to the pulses of the light load pulse signal; and stopping charging the capacitor when the load determining signal indicates that the switching mode power supply works under the normal working mode, wherein, a current provided by the current source decreases when the switching mode power supply enters the light load working mode.

In one embodiment, the step 602 comprises: charging a capacitor with a current source to provide a capacitor voltage; generating a light load pulse signal based on a comparison result of the capacitor voltage and a light load pulse reference; discharging the capacitor in response to the pulses of the light load pulse signal; and stopping charging the capacitor when the load determining signal indicates that the switching mode power supply works under normal working mode, wherein, a current provided by the current source increases when the switching mode power supply enters the light load working mode.

Figure 7:
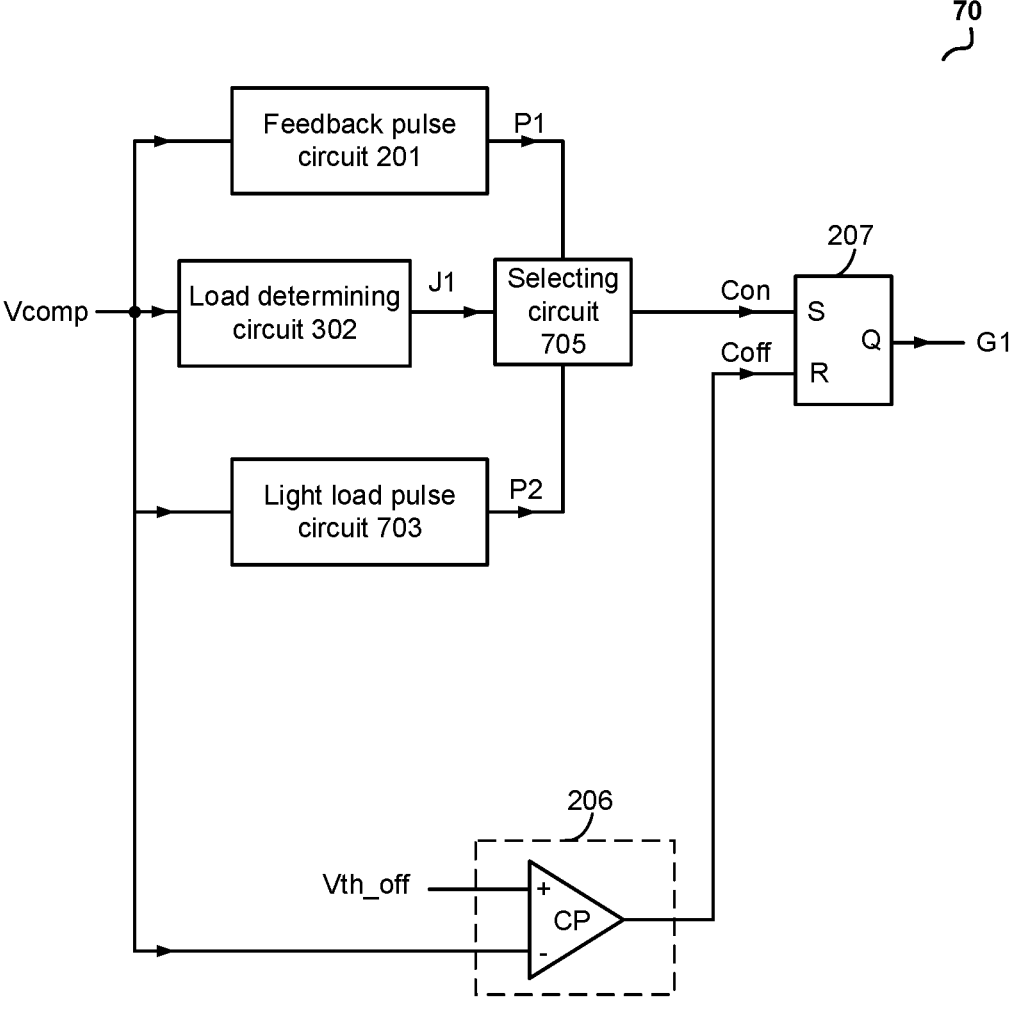
FIG. 7 schematically shows a control circuit 70 of a switching mode power supply in accordance with an embodiment of the present invention.

FIG. 7 schematically shows a control circuit 70 of a switching mode power supply in accordance with an embodiment of the present invention. The control circuit 70 may be used with the flyback converter 10 in FIG. 1, and also could be used with switching mode power supplies having other topologies, like buck converter, boost converter, buck-boost converter, etc. As shown in FIG. 7, the control circuit 70 includes the feedback pulse circuit 201, a load determining circuit 302, a light load pulse circuit 703, a selecting circuit 705, the off control circuit 206 and the driving logic circuit 207.

The feedback pulse circuit 201 is configured to receive the feedback signal Vcomp, and to provide the feedback pulse signal P1 based on the feedback signal Vcomp as illustrated earlier. The feedback pulse signal P1 has a frequency which is varying as the feedback signal Vcomp varies. As mentioned earlier, the feedback signal Vcomp represents the load of the switching mode power supply. That is to say, the feedback pulse signal P1 has a frequency which is varying as the load of the switching mode power supply varies. In one embodiment, the frequency of the feedback pulse signal P1 increases as the load of the switching mode power supply increases.

The load determining circuit 302 receives the feedback signal Vcomp, and provides a load determining signal J1 based on the feedback signal Vcomp. The feedback signal Vcomp indicates the load of the switching mode power supply. The load determining signal J1 indicates the load level of the switching mode power supply. As illustrated in FIGS. 3 and 5, the feedback signal Vcomp is compared with the enter-light-load-mode threshold Vbi and the exit-light-load-mode threshold Vbo. The load determining signal J1 determines that the load of the switching mode power supply is above a certain load level when the feedback signal Vcomp is higher than the exit-light-load-mode threshold Vbo, and determines that the load of the switching mode power supply is under a certain load level when the feedback signal Vcomp is smaller than the enter-light-load-mode threshold Vbi. The switching mode power supply works under different modes when the load is at different load level. In one embodiment, the switching mode power supply works in PFM when the load is above the certain load level, and works in a Burst mode when the load is under the certain load level.

The light load pulse circuit 703 receives the feedback signal Vcomp, and provides a light load pulse signal P2. The light load pulse signal P2 is provided to control power switch of the switching mode power supply (e.g., PM1 of the switching mode power supply 10 in FIG. 1) operating at different switching frequencies.

The selecting circuit 705 receives the load determining signal J1, the feedback pulse signal P1, and the light load pulse signal P2. Based on the load determining signal J1, i.e., the load level of the switching mode power supply, the selecting circuit 705 provides the feedback pulse signal P1 or the light load pulse signal P2 as the on control signal Con to control turning on of the power switch. Specifically, the feedback pulse signal P1 is provided as the on control signal Con when the load determining signal J1 indicates that the load of the switching mode power supply is above the certain load level, and the light load pulse signal P2 is provided ad the on control signal Con when the load determining signal J1 indicates that the load of the switching mode power supply is under the certain load level. In other embodiments, instead of providing the feedback pulse signal P1 or the light load pulse signal P2 as the on control signal Con, the on control signal Con is provided based on the feedback pulse signal P1 or the light load pulse signal P2.

The off control circuit 206 receives the feedback signal Vcomp and the off threshold signal Vth_off, and provides the off control signal Coff as mentioned earlier. In one embodiment, the off control signal Coff controls to turn off the power switch of the switching mode power supply when the feedback signal Vcomp decreases to the off threshold signal Vth_off. The driving logic circuit 207 receives the on control signal Con and the off control signal Coff, and provides the power control signal G1 for controlling the operation of the power switch of the switching mode power supply.

In the embodiment of FIG. 7, the feedback pulse signal P1 or the light load pulse signal P2 is selected for turning on the power switch, meanwhile determining the frequency of the power switch, according to the load level of the switching mode power supply. In one embodiment, when the load of the switching mode power supply is above the certain load level, the switching mode power supply is working under PFM, and the feedback pulse signal P1 is selected to control turning on the power switch. The frequency of the power switch varies as the load of the switching mode power supply varies, for example, the frequency of the power switch increases as the load of the switching mode power supply increases simultaneously. When the load of the switching mode power supply is below the certain load level, the switching mode power supply is working under Burst mode, and the light load pulse signal P2 is selected to control turning on the power switch. The frequency of the power switch is fixed to different levels according to the load of the switching mode power supply.

Figures 8, 9:
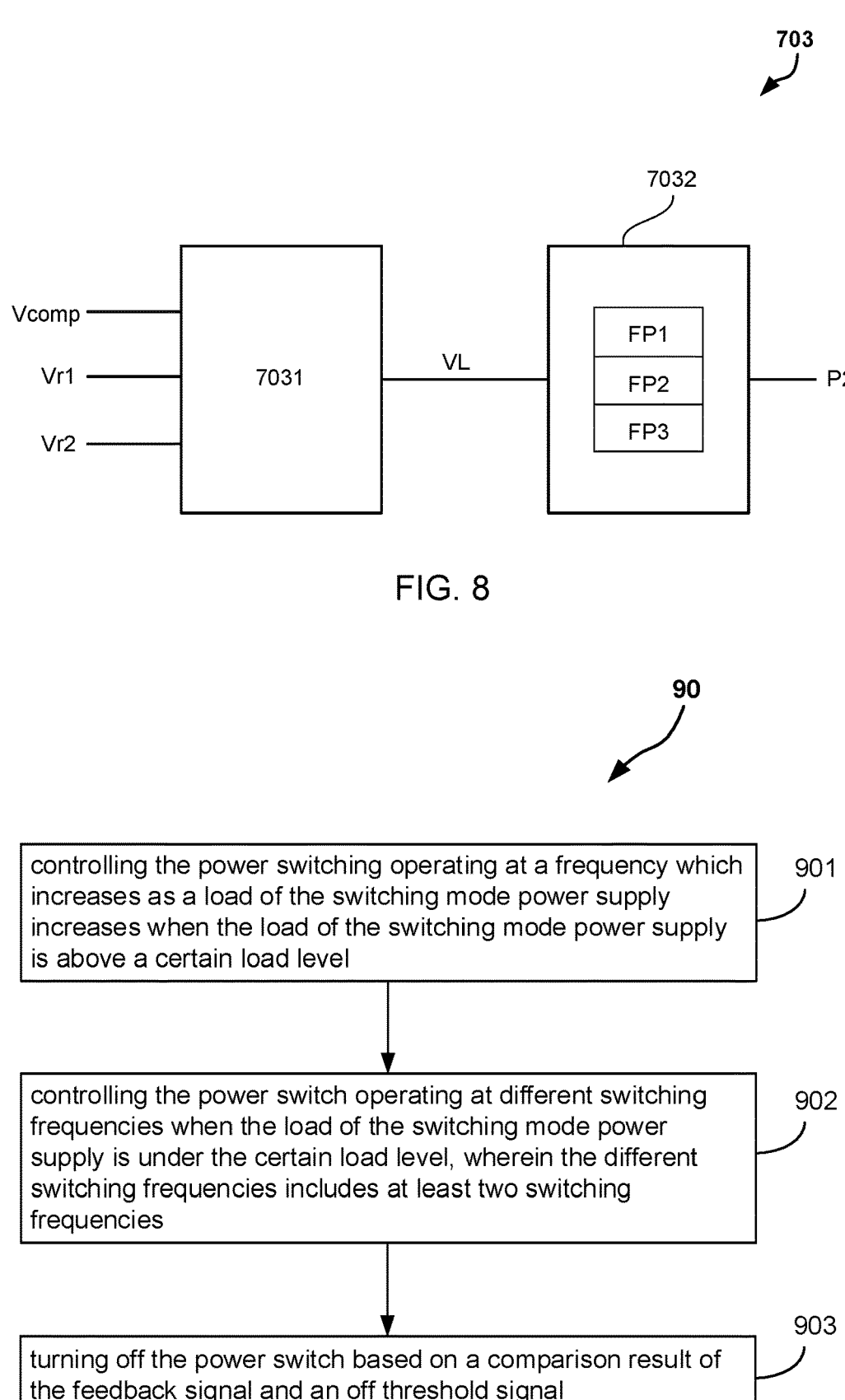
FIG. 8 schematically illustrates the light load pulse circuit 703 in accordance with an embodiment of the present invention.
FIG. 9 shows a flow chart of a method 90 for controlling a switching mode power supply in accordance with an embodiment of the present invention.

FIG. 8 schematically illustrates the light load pulse circuit 703 in accordance with an embodiment of the present invention. As shown in FIG. 8, the light load pulse circuit 703 includes a load comparing circuit 7031 and a frequency selecting circuit 7032. The load comparing circuit 7031 receives the feedback signal Vcomp, and compares the feedback signal Vcomp with a first load reference Vr1 and a second reference Vr2 to generate a frequency selecting signal VL. The frequency selecting circuit 7032 receives the frequency selecting signal VL, and provides the light load pulse signal P2 having a frequency determined by the frequency selecting signal VL.

In one embodiment, the feedback signal Vcomp is proportional to the load of the switching mode power supply, the first load reference Vr1 is larger than the second load reference Vr2. In one embodiment, when the feedback signal Vcomp is larger than the first load reference Vr1, the light load pulse signal P2 has a first frequency FP1 which makes the power switch operate at a first switching frequency. When the feedback signal Vcomp is between the first load reference Vr1 and a second load reference Vr2, the light load pulse signal P2 has a second frequency FP2 which makes the power switch operate at a second switching frequency. When the feedback signal Vcomp is smaller than the second load reference Vr2, the light load pulse signal P2 has a third frequency FP3 which makes the power switch operate at a third switching frequency. In one embodiment, the first switching frequency is larger than the second frequency which is larger than the third frequency.

The frequency selecting circuit 7032 may be implemented in a digital way or an analog way. For example, the frequency selecting circuit 7032 may include timers/counters and frequency dividers to generate the light load pulse signal P2 having different frequencies. Also, the frequency selecting circuit 7032 may be implemented by capacitor-switch circuits like the light load pulse circuits 303 and 503 described earlier. In that case, the frequency of the light load pulse signal P2 may be modified by setting different values for the current source I1 or the light load pulse reference Vref1.

FIG. 9 shows a flow chart of a method 90 for controlling a switching mode power supply in accordance with an embodiment of the present invention. The switching mode power supply could be the flyback converter 10 in FIG. 1, or has other topologies with a power switch. The control method 90 includes step 901, controlling the power switching operating at a frequency which increases as a load of the switching mode power supply increases when the load of the switching mode power supply is above a certain load level; and step 902, controlling the power switch operating at different switching frequencies when the load of the switching mode power supply is under the certain load level. The different switching frequencies includes at least two switching frequencies.

In one embodiment, the different switching frequencies includes a first switching frequency, a second switching frequency and a third switching frequency. The power switch operates at the first switching frequency when a feedback signal indicative of the load of the switching mode power supply is larger than a first load reference. The power switch operates at a second switching frequency when the feedback signal is between the first load reference and a second reference. The power switch operates at a third switching frequency when the feedback signal is smaller than the second load reference. The first switching frequency is higher than the second switching frequency, the second switching frequency is higher than the third switching frequency, and the first load reference is larger than the second load reference.

In one embodiment, the method 90 further includes step 903, turning off the power switch based on a comparison result of the feedback signal and an off threshold signal.

In one embodiment, the method 90 further includes step 904, determining whether the load of the switching mode power supply is above the certain load level or not based on the feedback signal.

In one embodiment, the step 904 includes: determining the load of the switching mode power supply is above the certain load level when the feedback signal is larger than an exit-light-load-mode threshold; and determining the load of the switching mode power supply is under the certain load level when the feedback signal is smaller than an enter-light-load-mode threshold.

It should be known that steps 901-904 could be carried out without specific order.

Obviously many modifications and variations of the present invention are possible in light of the above teachings. It is therefore to be understood that within the scope of the appended claims the invention may be practiced otherwise than as specifically described. It should be understood, of course, the foregoing disclosure relates only to a preferred embodiment (or embodiments) of the invention and that numerous modifications may be made therein without departing from the spirit and the scope of the invention as set forth in the appended claims. Various modifications are contemplated and they obviously would be resorted to by those skilled in the art without departing from the spirit and the scope of the invention as hereinafter defined by the appended claims as only a preferred embodiment(s) thereof has been disclosed.

What is claimed is:

1. A control circuit for controlling a switching mode power supply having a power switch, comprising:
    a feedback pulse circuit, configured to provide a feedback pulse signal to control the power switch operating at a frequency which increases as a load of the switching mode power supply increases, when the load of the switching mode power supply is above a certain load level; and
    a light load pulse circuit, configured to provide a light load pulse signal to control the power switch operating at different switching frequencies when the load of the switching mode power supply is under the certain load level, wherein the different switching frequencies comprise a first switching frequency, a second switching frequency and a third switching frequency, and wherein:

the power switch operates at the first switching frequency when a feedback signal indicative of the load is larger than a first load reference;
the power switch operates at the second switching frequency when the feedback signal is between the first load reference and a second load reference; and
the power switch operates at the third switching frequency when the feedback signal is lower than the second load reference; wherein
the first switching frequency is higher than the second switching frequency, the second switching frequency is higher than the third switching frequency, the first load reference is larger than the second load reference; and wherein
the load of the switching mode power supply is above the certain load level when the feedback signal indicative of the load of the switching mode power supply is larger than an exit-light-load-mode threshold; and
the load of the switching mode power supply is under the certain load level when the feedback signal is smaller than an enter-light-load-mode threshold.

2. The control circuit of claim 1, wherein the feedback pulse circuit comprises a voltage-frequency converting circuit.

3. The control circuit of claim 1, further comprising:
    a load determining circuit, configured to provide a load determining signal for indicating whether the load of the switching mode power supply is above the certain load level or not based on the feedback signal; and
    a selecting circuit, configured to provide an on control signal corresponds to the feedback pulse signal when the load determining signal indicates that the load of the switching mode power supply is above the certain load level, and to provide the on control signal corresponds to the light load pulse signal when the load determining signal indicates that the load of the switching mode power supply is under the certain load level; wherein
    the on control signal is configured to turn on the power switch.

4. The control circuit of claim 3, further comprising:
    an off control circuit, configured to provide an off control signal based on a comparison result of the feedback signal and an off threshold signal; and
    a driving logic circuit, configured to provide a power control signal for controlling the power switch based on the on control signal and the off control signal.

5. The control circuit of claim 3, wherein the load determining circuit provides the load determining signal based on a comparison result of the feedback signal, the exit-light-load-mode threshold and the enter-light-load-mode threshold.

6. A switching mode power supply, comprising:
    a power switch;
    a control circuit, configured to provide an on control signal for turning on the power switch, wherein the control circuit comprises:
        a feedback pulse circuit, configured to provide a feedback pulse signal to control the power switch operating at a frequency which increases as a load of the switching mode power supply increases, when the load of the switching mode power supply is above a certain load level; and
        a light load pulse circuit, configured to provide a light load pulse signal to control the power switch operating at different switching frequencies when the load of the switching mode power supply is under the certain load level, wherein the different switching frequencies comprise a first switching frequency, a second switching frequency and a third switching frequency, and wherein:

the power switch operates at the first switching frequency when a feedback signal indicative of the load is larger than a first load reference;

the power switch operates at the second switching frequency when the feedback signal is between the first load reference and a second load reference; and the power switch operates at the third switching frequency when the feedback signal is lower than the second load reference; wherein the first switching frequency is higher than the second switching frequency, the second switching frequency is higher than the third switching frequency, the first load reference is larger than the second load reference; and wherein the load of the switching mode power supply is above the certain load level when the feedback signal indicative of the load of the switching mode power supply is larger than an exit-light-load-mode threshold; and the load of the switching mode power supply is under the certain load level when the feedback signal is smaller than an enter-light-load-mode threshold.

7. The switching mode power supply of claim 6, wherein the feedback pulse circuit comprises a voltage-frequency converting circuit.

8. The switching mode power supply of claim 6, wherein the control circuit further comprises:

a load determining circuit, configured to provide a load determining signal for indicating whether the load of the switching mode power supply is above the certain load level or not based on the feedback signal; and a selecting circuit, configured to provide the on control signal corresponds to the feedback pulse signal when the load determining signal indicates that the load of the switching mode power supply is above the certain load level, and to provide the on control signal corresponds to the light load pulse signal when the load determining signal indicates that the load of the switching mode power supply is under the certain load level.

9. The switching mode power supply of claim 8, wherein the control circuit further comprises:

an off control circuit, configured to provide an off control signal based on a comparison result of the feedback signal and an off threshold signal; and a driving logic circuit, configured to provide a power control signal for controlling the power switch based on the on control signal and the off control signal.

10. The switching mode power supply of claim 8, wherein the load determining circuit provides the load determining signal based on a comparison result of the feedback signal, the exit-light-load-mode threshold and the enter-light-load-mode threshold.

11. A control method for controlling a switching mode power supply having a power switch, comprising:

controlling the power switching operating at a frequency which increases as a load of the switching mode power supply increases when the load of the switching mode power supply is above a certain load level; and controlling the power switch operating at different switching frequencies when the load of the switching mode power supply is under the certain load level, wherein the different switching frequencies comprise a first switching frequency, a second switching frequency and a third switching frequency, and wherein:

the power switch operates at the first switching frequency when a feedback signal indicative of the load of the switching mode power supply is larger than a first load reference;

the power switch operates at the second switching frequency when the feedback signal is between the first load reference and a second load reference; and the power switch operates at the third switching frequency when the feedback signal is smaller than the second load reference; and wherein the first switching frequency is higher than the second switching frequency, the second switching frequency is higher than the third switching frequency, and the first load reference is larger than the second load reference; and wherein the load of the switching mode power supply is above the certain load level when the feedback signal indicative of the load of the switching mode power supply is larger than an exit-light-load-mode threshold; and the load of the switching mode power supply is under the certain load level when the feedback signal is smaller than an enter-light-load-mode threshold.

12. The control method of claim 11, further comprising:

turning off the power switch based on a comparison result of the feedback signal indicating the load of the switching mode power supply and an off threshold signal.

* * * * *